United States Patent
Hopkinson et al.

(10) Patent No.: US 8,535,036 B2
(45) Date of Patent: Sep. 17, 2013

(54) METHOD AND APPARATUS FOR COMBINING PARTICULATE MATERIAL

(75) Inventors: Neil Hopkinson, Nottingham (GB); Poonjolai Erasenthiran, Nottingham (GB)

(73) Assignee: Loughborough University Enterprises Limited, Loughborough, Leicestershire (GB)

( * ) Notice: Subject to any disclaimer, the term of this patent is extended or adjusted under 35 U.S.C. 154(b) by 136 days.

(21) Appl. No.: 13/007,509

(22) Filed: Jan. 14, 2011

(65) Prior Publication Data

US 2011/0107967 A1    May 12, 2011

Related U.S. Application Data

(62) Division of application No. 10/564,575, filed as application No. PCT/GB2004/003142 on Jul. 20, 2004, now Pat. No. 7,879,282.

(30) Foreign Application Priority Data

Jul. 25, 2003 (GB) .................................. 0317387.9

(51) Int. Cl.
*B28B 17/00* (2006.01)
(52) U.S. Cl.
USPC ........ 425/174.4; 425/145; 425/375; 264/113; 264/308; 264/401; 264/497
(58) Field of Classification Search
USPC .............. 425/174.4, 145, 375; 264/113, 308, 264/401, 497
See application file for complete search history.

(56) References Cited

U.S. PATENT DOCUMENTS

| 4,752,498 A | | 6/1988 | Fudim | |
|---|---|---|---|---|
| 5,182,056 A | | 1/1993 | Spence et al. | |
| 5,204,055 A | * | 4/1993 | Sachs et al. | 419/2 |
| 5,597,589 A | * | 1/1997 | Deckard | 425/174.4 |

(Continued)

FOREIGN PATENT DOCUMENTS

| DE | 3702449 | 8/1987 |
|---|---|---|
| DE | 4416901 | 11/1995 |

(Continued)

OTHER PUBLICATIONS

Holm Fleischer, European Search Report for EP 04743477.4, Aug. 27, 2010.

(Continued)

*Primary Examiner* — Joseph S Del Sole
*Assistant Examiner* — David N Brown, II
(74) *Attorney, Agent, or Firm* — Chernoff Vilhauer McClung & Stenzel LLP

(57) ABSTRACT

A method of selectively combining particulate material, for example plastics material by sintering, comprises providing a layer of particulate material, providing radiation, for example using a radiation source over the layer, and varying the absorption of the provided radiation across a selected surface portion of the layer to combine a portion of the material of the layer. The method may comprise varying radiation absorption by varying the intensity of the radiation incident on the surface portion of the layer, or alternatively may comprise varying the radiation absorptive properties of the particulate material over the selected surface portion of the layer, for example by printing a radiation absorbent material onto the surface portion.

6 Claims, 4 Drawing Sheets

(56) References Cited

U.S. PATENT DOCUMENTS

| | | | |
|---|---|---|---|
| 5,985,204 A | 11/1999 | Otsuka et al. | |
| 6,007,764 A | 12/1999 | Benda | |
| 6,147,138 A | 11/2000 | Hoechsmann et al. | |
| 6,217,816 B1 | 4/2001 | Tang | |
| 6,500,378 B1 | 12/2002 | Smith | |
| 6,531,086 B1 | 3/2003 | Larsson | |
| 6,589,471 B1* | 7/2003 | Khoshnevis | 264/497 |
| 7,220,380 B2 | 5/2007 | Farr et al. | |
| 7,296,990 B2 | 11/2007 | Devos et al. | |
| 2002/0145213 A1* | 10/2002 | Liu et al. | 264/40.1 |
| 2002/0149137 A1 | 10/2002 | Jang et al. | |
| 2003/0052105 A1 | 3/2003 | Nagano et al. | |
| 2004/0104499 A1 | 6/2004 | Keller | |
| 2005/0012247 A1* | 1/2005 | Kramer et al. | 264/401 |
| 2005/0093208 A1* | 5/2005 | Boyd et al. | 264/442 |
| 2009/0068376 A1 | 3/2009 | Philippi | |

FOREIGN PATENT DOCUMENTS

| | | |
|---|---|---|
| DE | 102004012682 A1 | 10/2005 |
| EP | 0535984 | 4/1993 |
| EP | 0882568 A2 | 12/1998 |
| EP | 1459871 A2 | 9/2004 |
| EP | 1600281 A1 | 11/2005 |
| EP | 1707341 A1 | 10/2006 |
| EP | 1737646 A1 | 1/2007 |
| JP | 2002264221 A | 9/2002 |
| WO | 88/06494 | 9/1988 |
| WO | 9851464 A1 | 11/1998 |
| WO | 01/38061 | 5/2001 |
| WO | 2005090055 | 9/2005 |
| WO | 2008013483 A1 | 1/2008 |

OTHER PUBLICATIONS

Tim James, United Kingdom Search Report for GB1113612.4, Dec. 22, 2011.

* cited by examiner

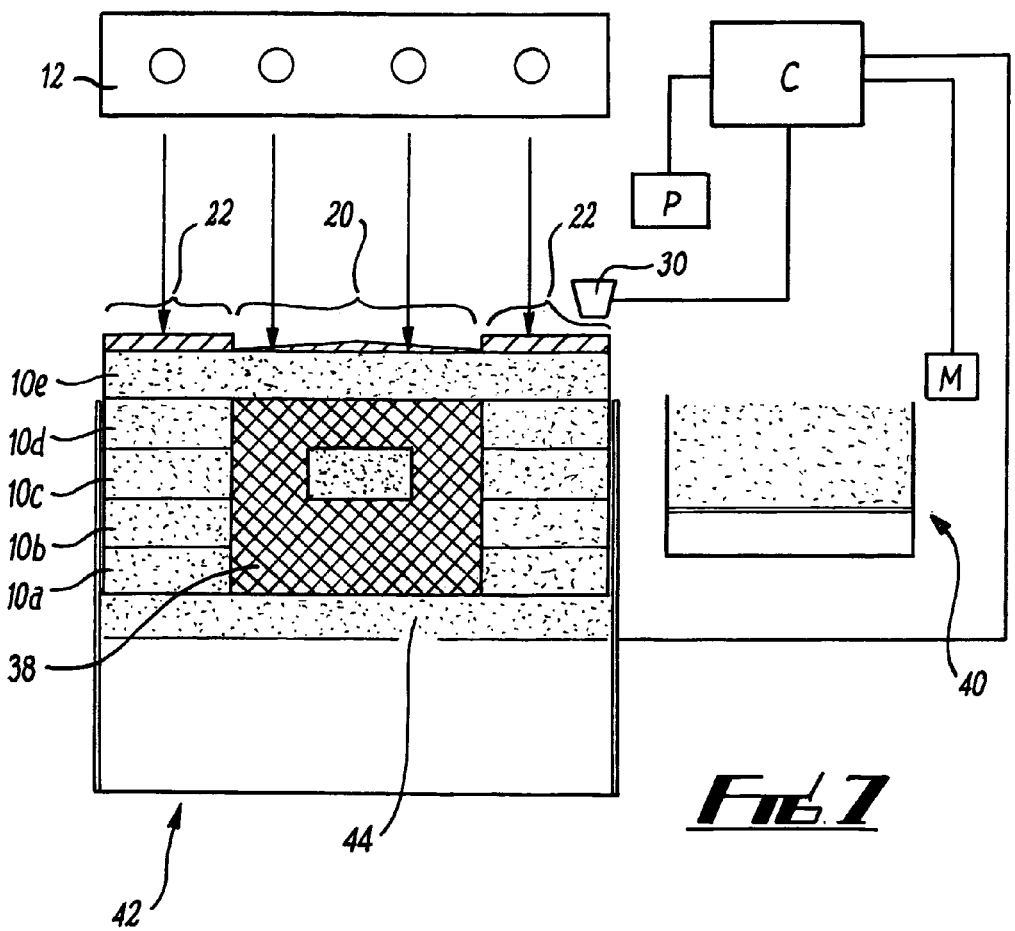
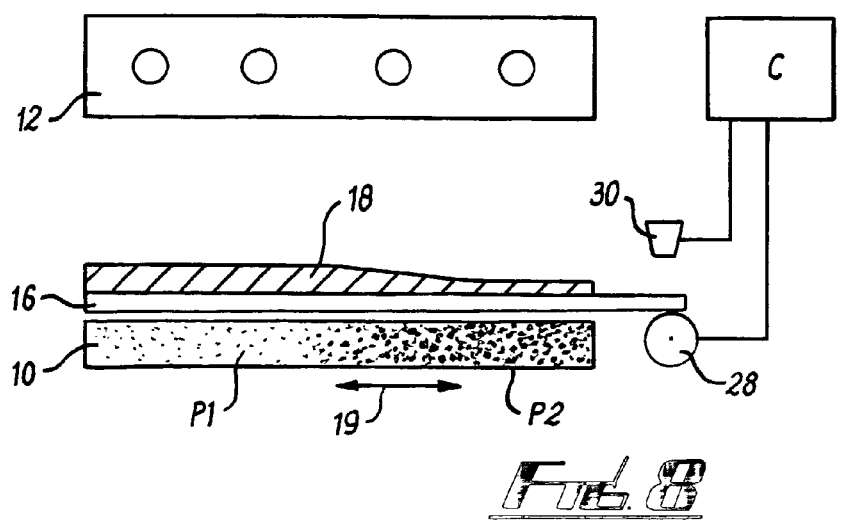

METHOD AND APPARATUS FOR COMBINING PARTICULATE MATERIAL

CROSS-REFERENCE TO RELATED APPLICATION

This is a divisional of co-pending patent application Ser. No. 10/564,575 filed Jan. 13, 2006, which is a national phase application filed under 35 USC 371 based on International Application No. PCT/GB2004/003142 filed Jan. 10, 2005, and claims priority under 35 USC 119 of United Kingdom Patent Application No. GB 0317387.9 filed Jul. 25, 2003.

Embodiments of the present invention relate to a method of selectively combining particulate material and/or apparatus for combining particulate material.

Rapid Prototyping is widely used to form prototype components, and a number of methods are currently available for carrying out rapid prototyping. In one method, a computer generated three dimensional model of the component is initially produced using computer assisted drawing (CAD) software. The three dimensional model is then sliced into a number of virtual layers, and a device used to form and combine the layers to create the three dimensional component.

It is known to form the respective layers by combining particulate material using a laser that sinters the particulate material. However, this method can be disadvantageous since the laser must pass over the entire surface of each layer, which can be time consuming. As an alternative, infra-red radiation can be provided on selected portions of a layer of particulate material to combine it. However, the accuracy of the components produced using this method may be unsatisfactory.

According to a first aspect of the present invention, there is provided a method of selectively combining particulate material, comprising the steps of:
 (i) providing a layer of particulate material;
 (ii) providing radiation over the layer of particulate material; and
 (iii) varying the absorption of the provided radiation across a selected surface portion of the layer to combine a portion of the material of the layer.

According to a second aspect of the present invention, there is provided apparatus for combining particulate material, the apparatus comprising a controller for enabling the exposure of a surface portion of a layer of particulate material to radiation, wherein the controller is arranged to control the variation of radiation absorption across said surface portion.

Preferred features of the invention are defined in the accompanying claims.

The surface portion that receives variable radiation absorption may be a part, and not the whole, of the surface of the layer of particulate material.

The provision of variable radiation absorption across the surface portion may require the existence of multiple areas in which the absorption of radiation is different and greater than zero.

According to one embodiment, the variable radiation absorption across the surface portion may be provided by varying the intensity of the provided radiation incident on the surface portion of the layer of particulate material.

According to a different embodiment, the variable radiation absorption across the surface portion may be provided by varying the absorptive properties of the particulate material across the selected surface portion of the layer.

Embodiments of the present invention will now be described by way of example only and with reference to the accompanying drawings, in which:—

FIG. 6b is a side view of the layer of particulate material of FIG. 6a;

FIG. 7 is a diagrammatic schematic view of apparatus for combining particulate material being used to form a three dimensional object; and FIG. 8 is a diagrammatic view of the apparatus of FIG. 1 being used to combine different types of particulate material.

Figure 1:
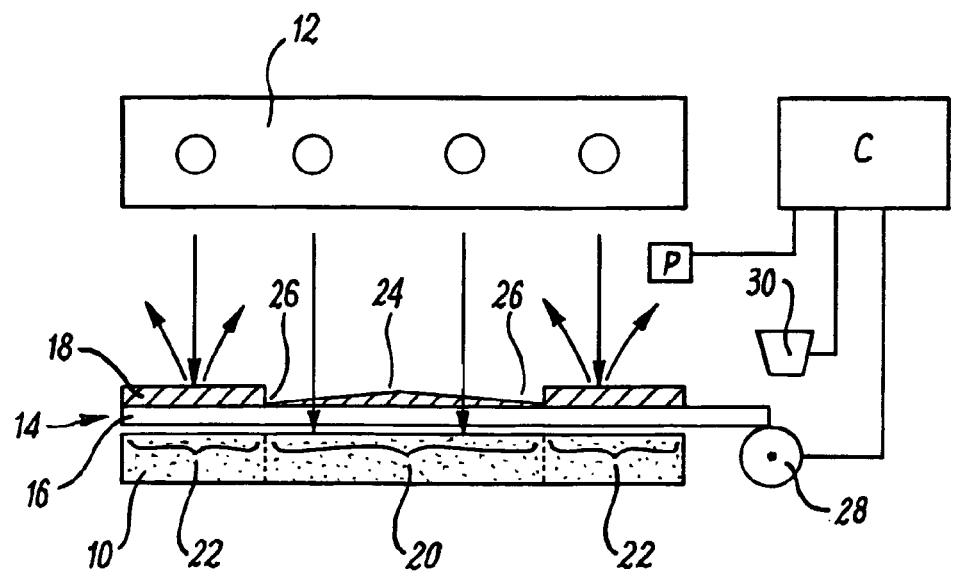
FIG. 1 is a diagrammatic illustration of a first embodiment of apparatus for combining particulate material.

Referring to the drawings, there is shown generally apparatus for combining particulate material, for example plastics material by sintering, the apparatus comprising a controller C for enabling the exposure of a surface portion of a layer 10 of particulate material to radiation, for example infra-red radiation provided by a radiation source 12, the controller C being arranged to control the variation of radiation absorption across the surface portion.

In more detail, FIG. 1 illustrates a first embodiment of apparatus for sintering particulate material in which an obscurer 14 (i.e. a mask) is provided for selectively obscuring the radiation provided by the source 12 on the surface portion of the layer 10 to thereby vary the intensity of the radiation incident on the surface portion of the layer 10. The obscurer 14 comprises a radiation transmissive substrate 16, such as a glass plate, which carries a varying amount of radiation reflective material 18, such as aluminium oxide. The amount and pattern of material 18 deposited on the substrate may be varied to selectively vary the intensity of radiation incident on the surface portion of the layer 10, as will be described hereinafter.

Figure 2:
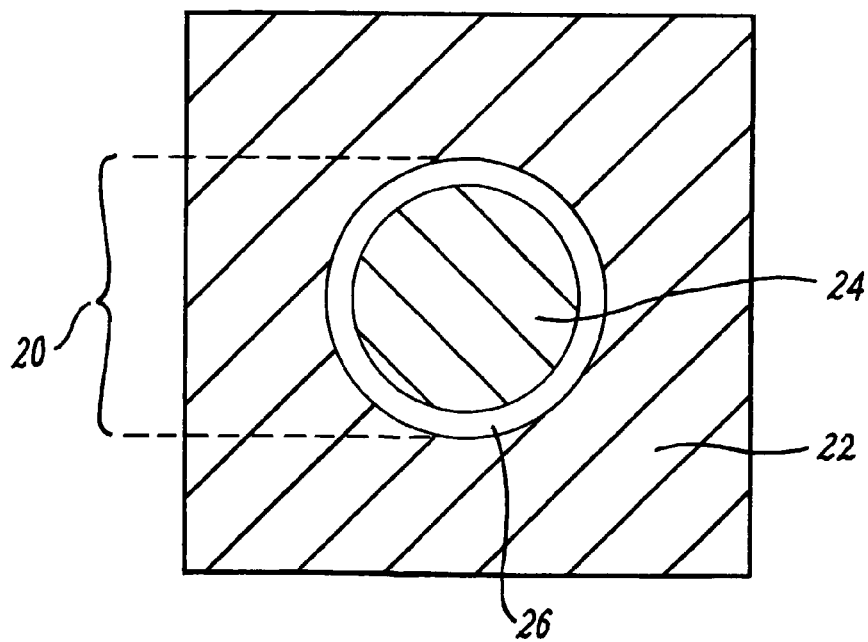
FIG. 2 is a diagrammatic plan view of a surface portion of a layer of particulate material.

Referring also to FIG. 2, the surface portion of the layer 10 is logically divided by the obscurer 14 into a number of areas including a combination portion 20, which is to be exposed to radiation to combine the particulate material, and a non-combination portion 22 which is to be shielded, or at least substantially shielded, from radiation to prevent combination of the particulate material by sintering. Full shielding of the non-combination portion 22 is not essential, provided that the intensity of radiation transmitted to the non-combination portion 22 is such that the particulate material is not heated to its sintering temperature. In some circumstances, transmission of low intensity radiation onto the non-combination portion 22 to heat the material can be desirable and can result in improved accuracy of the finished component. This is because heating material in the non-combination portion 22 reduces the thermal gradient between the material in the combination portion 20 and the non-combination portion 22.

The combination portion 20 is logically divided by the obscurer 14 into a central portion 24 and an edge portion 26, and reflective material 18 is deposited onto the substrate 16 such that a greater amount of the material 18 is provided on the central portion 24 than on the edge portion 26 where no reflective material 18 may be provided. Consequently, the intensity of radiation provided across the surface of the combination portion 20 increases from a minimum value at the central portion 24 to a maximum value at the edge portion 26 where the surface of the layer 10 of particulate material is fully exposed to radiation provided by the radiation source 12.

The layer of reflective material is schematically illustrated in FIG. 1. The variation of thickness of the layer in the figure does not illustrate a variation of thickness of the layer in practice but illustrates a variation in the amount of the material. Where the layer is thick in the figure, in practice there will be a large amount of the material present.

Although the combination portion 20 has been shown to have only one edge portion 26 such that the central portion 24 is located at the centre of the combination portion 20, it should be appreciated that the combination portion 20 may for example be of annular configuration such that the central portion 24 is bounded on two sides by edge portions 26. Moreover, it is not essential that the central portion 24 is located at the centre of the surface portion of the layer 10 of particulate material.

The controller C is arranged to control a motor 28 for moving the obscurer 16 from an obscuring position in which it overlies the layer 10, as shown in FIG. 1, to a non-obscuring position in which it does not overly the layer 10. The controller C is also arranged to control a deposition device, such as a printing head 30, for depositing the reflective material 18 onto the substrate 16. The controller C controls the amount of material 18 deposited by the head 30 onto each part of the substrate 16. In the embodiment shown in FIG. 1, the head 30 remains stationary and deposits reflective material 18 onto the substrate 16 as the motor 28 moves the substrate 16 past the head 30. In an alternative embodiment (not shown), the substrate 16 may remain stationary, overlying the layer 10, and the motor 28 may move the printing head 30 over the substrate 16 to deposit reflective material 18 thereon.

In the illustrated embodiment, the reflective material 18 is contemporaneously printed onto the substrate 16 during operation of the apparatus. The amount of material 18 printed onto the substrate 16 by the head 30 may be varied by the controller C according to the surface temperature of the layer 10. The surface temperature of the layer 10 may be measured by a temperature measuring device, such as, for example, a pyrometer P or a thermal imaging camera, and surface temperature measurements are communicated in real time to the controller C. A wiping arrangement (not shown) may be provided for removing reflective material 18 from the substrate 16, so that it can be re-used. Different amounts of material 18 can be deposited onto the substrate 16, in dependence on the desired radiation intensity profile at the substrate surface.

Alternatively, the reflective material 18 may be pre-printed onto the substrate 16 prior to operation of the apparatus and the same pre-printed substrate 16, or a number of pre-printed substrates 16, may be used, one for each layer 10 of particulate material. In this case, measurement of the surface temperature using pyrometer P may not be needed. The use of a plurality of pre-printed substrates 16 is particularly advantageous when there is a need to produce a large quantity of the same component since it reduces the time taken to sinter each layer of material and hence produce the prototype component, increases repeatability and leads to a reduction in the cost of producing the components.

It should also be noted that it is within the scope of the present invention to utilise a plurality of pre-printed substrates 16, or to contemporaneously print different amounts of reflective material 18 onto the same substrate 16, and to use these to expose the same layer 10 of material to different radiation intensity profiles in multiple exposure steps.

Figure 3:
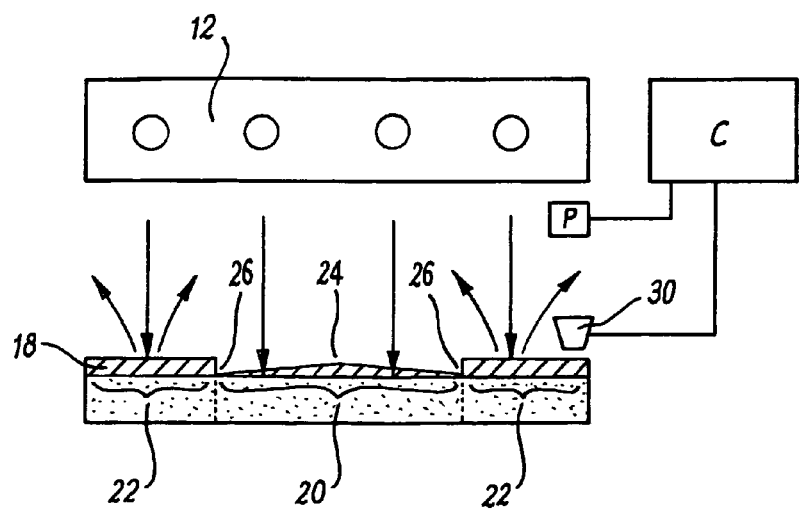
FIG. 3 is a diagrammatic illustration of a second embodiment of apparatus for combining particulate material.

FIG. 3 illustrates a second embodiment of apparatus for combining particulate material, in which corresponding elements are given corresponding reference numerals. The apparatus of FIG. 3 is similar to that shown in FIG. 1, except that instead of the reflective material 18 being deposited onto a substrate 16, the reflective material 18 is deposited, using the printing head 30, directly onto the surface portion of the layer 10 of particulate material.

In the apparatus of this embodiment, the printing head 30 is again controlled by the controller C which controls both the movement of the head 30 across the surface of the layer 10 and the rate of deposition of reflective material 18 onto the layer 10. Again, real time measurement of the surface temperature of the layer 10 may be carried out using a temperature measurement device, for example, a pyrometer P or thermal imaging camera, the temperature measurement being used by the controller C to determine the amount of reflective material 18 to be printed by the head 30 onto the surface portion of the layer 10.

The layer of reflective material is schematically illustrated in FIG. 3. The variation of thickness of the layer in the figure does not illustrate a variation of thickness of the layer in practice but illustrates a variation in the amount of the material. Where the layer is thick in the figure, in practice there will be a large amount of the material present.

Figure 4:
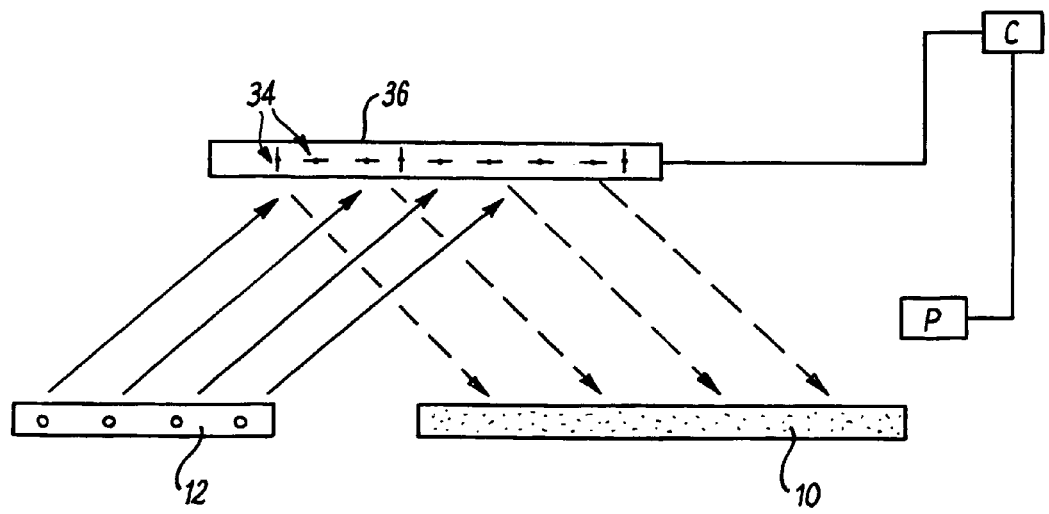
FIG. 4 is a diagrammatic view of a third embodiment of apparatus for combining particulate material.

FIG. 4 illustrates a third embodiment of apparatus for combining particulate material which is similar to the first and second embodiments and in which corresponding elements are given corresponding reference numerals. In this embodiment, the controller C is arranged to selectively redirect the radiation provided by the source 12 and thereby vary the radiation intensity incident across the surface portion of the layer 10. Selective redirection of the radiation is achieved by controlling, using the controller C, a plurality of mirrors 34 which form a Digital Mirror Device (DMD) 36. Each mirror 34 is adjustable by the controller to an operative position, in which radiation is fully redirected onto the surface portion of the layer 10, or to an inoperative position in which radiation is fully redirected away from the surface portion. By providing an array of mirrors 34, the surface portion of the layer 10 can be effectively divided into an array of segments, as discussed hereinafter, and the intensity of the radiation incident on each segment can be varied, according to a bitmap image, by selectively varying the frequencies at which individual mirrors 34 are moved between the operative and inoperative positions.

Use of a temperature measurement device, such as a pyrometer P, although optional is particularly advantageous with the apparatus of this embodiment as the position of each mirror 34 can be instantaneously controlled, in real time, by the controller C in response to instantaneous temperature variations across the surface portion of the layer 10.

Figure 5:
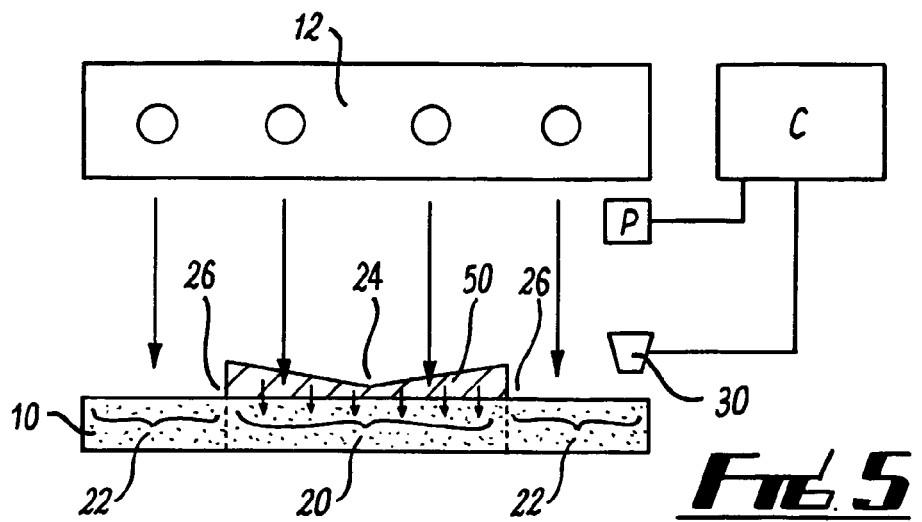
FIG. 5 is a diagrammatic view of a fourth embodiment of apparatus for combining particulate material.

FIG. 5 illustrates a fourth embodiment of apparatus for combining particulate material which is similar to the embodiments described above and in which corresponding elements have been given corresponding reference numerals.

The apparatus of FIG. 5 is most similar to the apparatus of FIG. 3 in that material is deposited directly onto the surface portion of the layer 10 of particulate material. However, according to the fourth embodiment, the material is a radiation absorbent material 50, for example a material such as carbon black in powder form. In use, radiation provided by the radiation source 12 is absorbed by the radiation absorbent material 50 where it is present on the surface, causing the radiation absorbent material 50 to heat up. Heat from the radiation absorbent material 50 is radiated to the underlying particulate material raising the temperature of individual particles of the particulate material. As the particles are heated to a temperature approaching their melting temperature, they neck and coalesce with adjacent heated particles. As the temperature subsequently decreases, the particles form a coherent mass of combined particulate material.

The deposition of a radiation absorbent material 50 directly onto the surface portion of the layer 10 enables the radiation absorptive properties of the particulate material to be varied and carefully controlled, as desired. In particular, varying the amount of the radiation absorbent material 50 on the surface enables the variation of the radiation absorptive properties of the surface portion of the underlying layer 10 of particulate material. In areas where there is a greater amount of the radiation absorbent material 50, a greater amount of the radiation provided by the radiation source 12 is absorbed. This provides for a greater amount of heat transfer to the underlying particulate material thereby heating it to a higher temperature and causing it to combine more rapidly. In areas where there is less absorbent material 50, there is lower radiation absorption and hence less heat transfer to the underlying particulate material, causing it to combine at a slower rate.

In areas where no radiation absorbent material 50 is provided and pure particulate material is exposed to the radiation provided by the radiation source 12, there will be insufficient absorption of the radiation to heat the particulate material to its melting temperature. Thus, there will be no combination of the particulate material in areas where no radiation absorbent material 50 is provided.

The layer of radiation absorbent material 50 is schematically illustrated in FIG. 5. The variation of thickness of the layer in the figure does not illustrate a variation of thickness of the layer in practice but illustrates a variation in the amount of the material. Where the layer is thick in the figure, in practice there will be a large amount of the material present.

As with the embodiments of FIGS. 1 and 3, it is desirable to provide for a greater amount of radiation absorption at the edge portion 26 of the combination portion 20 than at the central portion 24. Accordingly, the amount of the radiation absorbent material 50 decreases from a maximum value at the edge portion 26 to a minimum value at the central portion 24.

As illustrated, no radiation absorbent material 50 is provided on the surface portion of the layer 10 of the particulate material in the non-combination portion 22. For the reasons explained above, there will be no combination of the particulate material in the non-combination portion 22 when the layer 10 is exposed to radiation. There may however be some heating of the particulate material in the non-combination portion 22, and this can be advantageous to minimise the thermal gradient between the particulate material in the combination portion 20 and the non-combination portion 22, as already discussed.

As with the embodiment of FIG. 3, the printing head 30 is operable to deposit desired amounts of the radiation absorbent material 50 onto the surface portion of the layer 10, and the movement of the printing head 30 and the amount of material 50 deposited by the head 30 is controlled by the controller C. Again, the pyrometer P or a thermal imaging camera may be used to measure the surface temperature of the layer 10, the amount of radiation absorbent material 50 deposited being varied by the controller C in accordance with the temperature measurements.

The applicant has appreciated that when the particulate material is combined by sintering at a slow rate, the combined material has good material properties, for example high strength, but has poor definition at the edge portion 26. The poor edge definition arises because as the particulate material combines, there is some shrinkage which causes unwanted movement of uncombined particulate material from the non-combination portion 22 towards the combination portion 20. On the other hand, when the particulate material is combined by sintering at a rapid rate, the combined material has inferior material properties, but has good edge definition since the particulate material in the edge portion 26 is rapidly combined and locked in position, thereby minimising unwanted movement of surrounding uncombined particulate material.

In order to provide a layer 10 of combined particulate material having good material properties and good definition at the edge portion 26, it is thus desirable to cause the particulate material in the combination portion 20 to combine at a slow rate to provide good material properties, and to cause the particulate material at the edge portion 26 to combine rapidly to provide good edge definition.

One method by which this can be achieved is to use the apparatus according to the different embodiments of the invention described above to provide for greater absorption of radiation at the edge portion 26 than over the remainder of the combination portion 20. This can be achieved by varying the intensity of the radiation incident on the selected surface portion of the layer 10 using the apparatus according to the first, second or third embodiments, or by varying the absorption of the radiation across the selected surface portion by providing a variable amount of radiation absorbent material 50 across the surface portion. In all of the above cases, radiation is provided over the layer 10 in a single exposure step.

Using the apparatus according to the fourth embodiment of the invention, similar results may be achieved by providing radiation over the layer 10 of particulate material in multiple exposure steps, as will now be discussed.

According to a first method, a constant first amount of radiation absorbent material 50 is provided over the combination portion 20, and radiation is then provided over the layer 10, using the radiation source 12, to cause the underlying particulate material in the combination portion 20 to combine. The first amount of radiation absorbent material 50 is selected to be a relatively low amount so that the underlying particulate material combines at a slow rate and has good material properties.

After the particulate material has been combined, further particulate material is added to the layer 10 at the edge portion 26 where there will have been shrinkage. A second amount of the same radiation absorbent material 50, which is greater than the first amount, is then provided over the edge portion 26, and radiation is again provided over the layer 10 using the radiation source 12. The second amount of material is selected to be a relatively high amount so that the underlying particulate material is caused to combine at a rapid rate. Due to the increased amount of radiation absorbent material 50 present at the edge portion 26, and hence the rapid combination of the underlying particulate material, material shrinkage is minimised thus providing the resultant layer 10 of combined material with good definition at the edge portion 26.

According to a second method, a constant amount of a first radiation absorbent material 50 having a first natural radiation absorbency is provided over the combination portion 20, and radiation provided over the layer 10, using the radiation source 12, to cause the underlying particulate material in the combination portion 20 to combine. The first radiation absorbent material 50 is selected to have a low natural radiation absorbency so that a relatively low amount of the radiation is absorbed and so that the underlying particulate material combines at a slow rate and has good material properties.

After the particulate material has been combined, further particulate material is added to the layer 10 at the edge portion 26 where there will have been shrinkage. A second different radiation absorbent material 50, having a second natural radiation absorbency, is then provided over the edge portion 26, and radiation is again provided over the layer 10 using the radiation source 12. The second radiation absorbent material 50 is selected to have a high natural radiation absorbency, which is higher than the absorbency of the first radiation absorbent material 50, so that a high amount of the radiation is absorbed and so that the underlying particulate material in the edge portion 26 combines at a rapid rate.

According to a third method, a first radiation absorbent material 50 capable of absorbing a first wavelength of radiation is provided over the combination portion 20, and radiation of a first wavelength is then provided over the layer 10, using the radiation source 12, to cause the underlying particulate material in the combination portion 20 to combine.

After the particulate material has been combined, further particulate material is added to the layer 10 at the edge portion 26 where there will have been shrinkage. A second radiation absorbent material 50, capable of absorbing a second different wavelength of radiation, is then provided over the edge portion 26, and radiation of a second wavelength is provided over the layer 10 using the radiation source 12.

In order to provide the desired material properties in the combination portion 20, the radiation at the first wavelength may be selected to have a relatively low intensity so that the first radiation absorbent material 50 is heated at a slow rate thereby causing the underlying particulate material to combine at a slow rate. In order to provide good definition at the edge portion 26, the radiation at the second wavelength may selected to have a relatively high intensity so that the second radiation absorbent material 50 is heated rapidly thereby causing the underlying particulate material to combine at a rapid rate.

Alternatively, a greater amount of the second radiation absorbent material 50 than the first radiation absorbent material 50 may be provided, as described above with reference to the first method, and the radiation of the first and second wavelengths provided by the radiation source 12 selected to have the same intensity.

As a further alternative, the second radiation absorbent material 50 may be selected to have a higher natural radiation absorbency than the first radiation absorbent material 50, as described above with reference to the second method, and the radiation of the first and second wavelengths provided by the radiation source 12 selected to have the same intensity.

If desired, the third method could be adapted so that the first and second radiation absorbent materials 50 are simultaneously applied to the surface of the layer of particulate material, and the radiation of the first and second wavelengths provided in separate steps.

It is possible that the first, second and third methods described above could be modified so that the particulate material at the edge portion 26 of the layer 10 is initially caused to combine at a rapid rate to lock the edge portion 26, and the particulate material in the remainder of the combination portion 20 is subsequently caused to combine at a slow rate to provide the desired material properties.

Figure 6A:
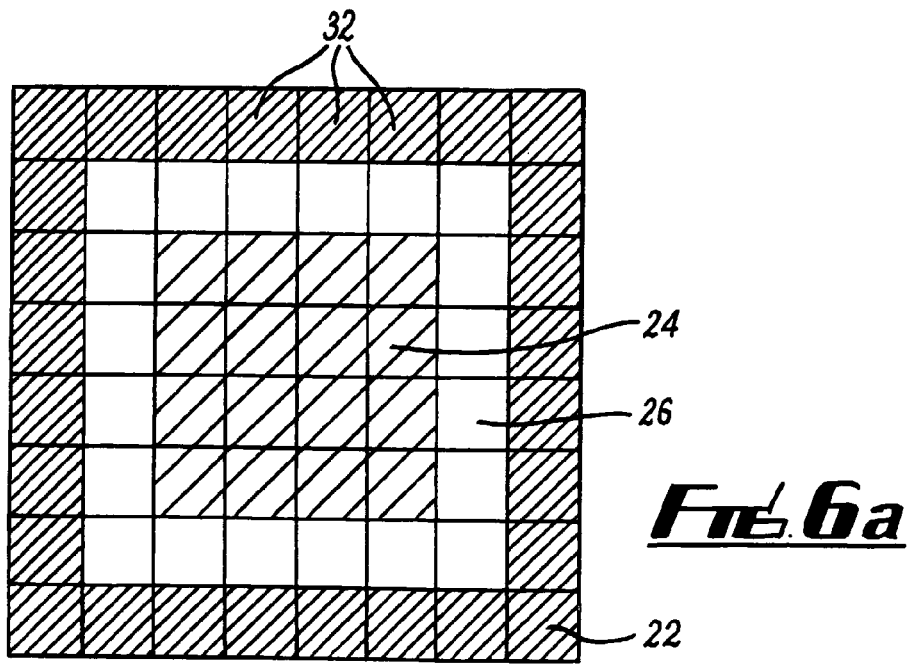
FIG. 6a is a further diagrammatic plan view of a surface portion of a layer of particulate material.
Figure 6B:
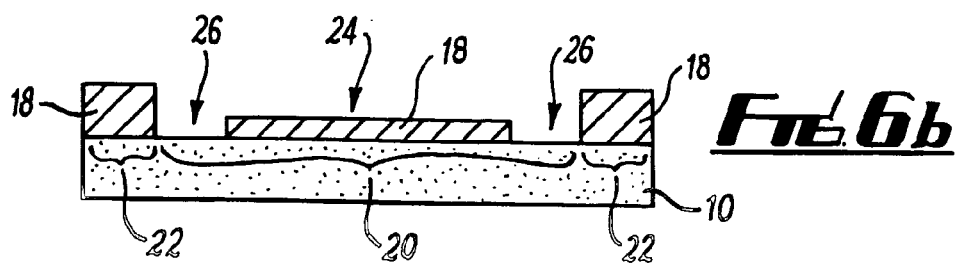

Referring now to FIGS. 6a and 6b, the apparatus according to the invention allows the surface portion of the layer 10 of particulate material to be logically divided into an array of segments 32. The controller can control the amount of radiation absorption on each segment 32 independently and a bitmap image can be used to specify the amount of radiation that should be absorbed at the surface portion. The greyscale of each segment 32 of the bitmap image is individually adjustable, and in the case of the first and second embodiments of the apparatus, the amount of reflective material 18 deposited onto each segment of the substrate 16 or surface portion of the layer 10 is individually adjustable, according to the bitmap image, to provide any desired radiation intensity profile over the surface portion of the layer 10. When the apparatus of the third embodiment is employed, the mirrors 34 are adjusted to vary the intensity of radiation incident on each segment 32 of the array. When the apparatus of the fourth embodiment is used, the amount of radiation absorbent material 50 deposited onto each segment of the surface portion of the layer 10 is individually adjustable, according to the bitmap image, to provide any desired radiation absorption profile over the surface portion of the layer 10.

In the arrangement shown in FIGS. 6a and 6b, a first amount of reflective material 18 has been deposited by printing head 30 onto the segments 32 defining the central portion 24 of the combination portion 20. Accordingly, a first intensity of radiation, which is less than the maximum intensity, is incident on the surface portion of the layer 10 located beneath these segments 32. The first intensity of radiation is sufficiently high to raise the temperature of the particulate material to cause it to combine. No reflective material 18 has been provided on the segments 32 which define the edge portion 26 of the combination portion 20, thereby allowing a maximum intensity of radiation to reach the surface portion of the layer 10 located beneath these segments 32. The maximum intensity of radiation causes the particulate material located beneath the segments 32 defining the edge portion 26 to combine more quickly than particulate material in the central portion 24.

A second amount of reflective material 18, which is greater than the first amount, is deposited by printing head 30 onto the segments 32 defining the non-combination portion 22. A sufficient amount of material 18 may be provided to prevent transmission of any radiation to the surface portion of the layer 10 located beneath these segments 32. Consequently, the particulate material located beneath these segments 32 does not combine.

Whilst variation of the radiation intensity on each individual segment 32 has been described with respect to the second embodiment of the apparatus, it is to be understood that the same effect can be achieved using apparatus according to the first embodiment, in which reflective material 18 is printed onto a substrate 16, according to the third embodiment, in which mirrors 34 are used to vary the intensity of radiation incident on each segment 32, or according to the fourth embodiment in which radiation absorbent material 50 is printed onto the surface portion of the layer 10 of particulate material.

The layer of reflective material is schematically illustrated in FIG. 6b. The variation of thickness of the layer in the figure does not illustrate a variation of thickness of the layer in practice but illustrates a variation in the amount of the material. Where the layer is thick in the figure, in practice there will be a large amount of the material present.

Referring now to FIG. 7, there is shown a diagrammatic illustration of the apparatus of FIG. 3 being used to form a three dimensional object 38. Again, elements of the apparatus which have been referred to above are given corresponding reference numerals.

The apparatus is used to form a three dimensional object 38 by combining a plurality of layers 10a to 10e of particulate material. A supply of particulate material, for example Nylon powder, is provided in a supply tank 40 and the controller C is arranged to control a motor M which can move particulate material from the tank 40 into a building device 42, which includes a vertically movable platform 44. Movement of the platform 44 is controlled by the controller C, such that the platform 44 is moved vertically downwards in discrete steps after each layer 10 has been formed.

Initially, with the platform 44 in an uppermost position, the controller C actuates the motor M to provide a first layer 10a of particulate material on the platform 44. The controller C then actuates the printing head 30 to deposit a desired pattern of reflective material 18 onto the surface portion of the layer 10 of material. Alternatively, the reflective material 18 may be deposited by the printing head 30 onto a substrate 16, as previously discussed, or the intensity incident at the surface may be controlled using digital mirrors.

The controller C then activates the radiation source 12 to provide radiation over a selected surface portion of the layer 10, as defined by the reflective material 18. As shown in FIG. 7, radiation is provided with varying intensity across the combination portion 20 and the material in this portion is combined. The reflective material 18 prevents, or at least substantially prevents, transmission of radiation to the surface portion of the material in the non-combination portion 22 where the material is not combined and remains in particulate form. The varying amount of reflective material 18 thus provides for variable intensity radiation across the combination portion 20 of the layer 10.

After combination of the material in the combination portion 20 of the first layer 10a has been carried out, the controller C deactivates the radiation source 12 and lowers the platform 44 by a distance approximately equivalent to the desired layer thickness. The controller C then actuates the motor M to provide a second layer 10b of particulate material overlying the first layer 10a including a previously combined portion of material. The controller C then actuates the printing head 30 to deposit reflective material 18 onto the surface portion of the second layer 10b. The amount and pattern of reflective material 18 deposited onto the surface portion of the second layer 10b may be the same as that provided on the first layer 10a, or may be different, for example in response to design or surface temperature measurements carried out using the pyrometer P. The controller C then activates the radiation source 12 to provide radiation across the surface portion of the second layer 10b, the reflective material 18 providing for variable intensity radiation across the surface portion. The material in the combination portion 20 of the second layer 10b is thus caused to combine, and also to combine with the previously combined portion of material in the first layer 10a. The adjacent layers 10a, 10b are thus combined to form part of a coherent object 38.

The controller C continues to operate in this manner to provide further layers 10c to 10e of particulate material and combine them, until formation of the object 38 has been completed. Once the coherent object 38 has been formed, the platform 44 is raised by the controller C to eject the combined object 38 and any remaining uncombined particulate material surrounding the object 38 from the device 42.

Again, it should be appreciated that the apparatus according to any of the other embodiments of the invention may be used to form a three dimensional object 38.

FIG. 8 illustrates use of the apparatus of FIG. 1 to combine different particulate materials P1 and P2 which are located adjacent to each other in a layer 10. By way of illustration, the material P1, for example copper, may have a lower melting point than the material P2, for example steel, and may therefore combine by sintering at a lower temperature. The concentration of material P2 decreases from right to left across a transition gradient region 19. The concentration of material P1 decreases from left to right across the transition gradient region 19.

In order to ensure optimum material characteristics and minimise thermal stresses over the gradient region 19 between the materials P1 and P2, the substrate 16 may be provided with a high amount of reflective material 18 on the portion overlying the material P1 of the layer 10, a low amount of reflective material on the portion overlying the material P2 and an amount of reflective material over the gradient region 19 that decreases from left to right in the figure. By varying radiation intensity in this way, the materials P1 and P2 are heated to different temperatures using a fixed intensity radiation source 12 and are simultaneously combined to form a coherent layer.

The layer of reflective material 18 is schematically illustrated in FIG. 8. The variation of thickness of the layer in the figure does not illustrate a variation of thickness of the layer in practice but illustrates a variation in the amount of the material. Where the layer is thick in the figure, in practice there will be a large amount of the material present Whilst the first embodiment of the apparatus has been described for use in combining the dissimilar particulate materials P1 and P2, it will be readily appreciated that the second embodiment of the apparatus in which reflective material 18 is printed directly onto the surface portion of the layer 10, the third embodiment of the apparatus which uses mirrors 34 to selectively redirect radiation, or the fourth embodiment of the apparatus in which radiation absorbent material 50 is printed directly onto the surface portion of the layer 10, could alternatively be used.

In any of the above described embodiments, it may be desirable to add radiation absorbing material to the particulate material to increase the absorption of radiation. For example, a material such as carbon black may be used for this purpose.

Other particulate materials, such as ceramic filler powder, may be added to the particulate material to improve the material properties of the resultant component.

Where different radiation absorbent materials are employed, for example as described above with reference to FIG. 5, these may be of different colours to provide the resultant component with desired aesthetic properties.

Although embodiments of the invention have been described in the preceding paragraphs with reference to various examples, it should be appreciated the various modifications to the examples given may be made without departing from the scope of the present invention, as claimed. For example, although the use of infra-red radiation is described, radiation other than infra-red may be used, provided that it is able to elevate the particulate material to a temperature at which it combines by sintering. The source of radiation may be of any suitable type, for example, LEDs, a scanning laser or a halogen source. The particulate material that is combined by the above described embodiments may be any suitable material, such as a metal, ceramic etc. A device other than a motor M may be used to move particulate material from the supply tank 40 to the combination device 42. The combination device 42 may be of a different configuration to that shown. Any number of different types of particulate material may be provided in a layer 10. Alternatively, different types of particulate material may be provided in adjacent layers. Reflective material 18 may be deposited onto a lower surface of the substrate 16 rather than an upper surface, as illustrated. Different materials may be used for the reflective material 18 and the substrate 16. Any suitable material may be used for the radiation absorbent material 50. For example, a liquid suspension and/or a gas, for example carbon dioxide, could be employed instead of a powder material. The digital mirror device described in relation to FIG. 4 could be replaced by a series of diffractive optics, one for each layer.

Whilst endeavouring in the foregoing specification to draw attention to those features of the invention believed to be of particular importance, it should be understood that the Applicant claims protection in respect of any patentable feature or combination of features hereinbefore referred to and/or shown in the drawings, whether or not particular emphasis has been placed thereon.

The invention claimed is:

1. Apparatus for sintering particulate material, the apparatus comprising a printing head comprising radiation absorbent material, and a controller for enabling the exposure of a surface portion of a layer of particulate material to radiation, wherein the controller is arranged to control the variation of radiation absorption across said surface portion by controlling the printing head to deposit an amount of radiation absorbent material to the layer of particulate material, and wherein the deposition of the radiation absorbent material is controlled by the controller in accordance with the surface temperature of the layer.

2. Apparatus for sintering particulate material, the apparatus comprising a printing head comprising radiation absorbent material, and a controller for enabling the exposure of a surface portion of a layer of particulate material to radiation, wherein the controller is arranged to control the variation of radiation absorption across said surface portion by controlling the printing head to deposit an amount of radiation absorbent material to a subset of the layer of particulate material to increase the radiation absorbed by the subset of the layer of particulate material, wherein the controller is responsive to temperature variation across the surface portion and is arranged to control the deposition of an amount of radiation absorbent material in response to the temperature variation.

3. Apparatus according to claim 2, wherein the controller is arranged to control the deposition of different radiation absorbent materials capable of absorbing different wavelengths of radiation directly onto the surface portion of the layer, and to enable the exposure of the surface portion to radiation of different wavelengths.

4. Apparatus according to claim 1, further comprising a temperature measuring device for measuring the temperature of the surface portion of the layer of particulate material and for providing the surface temperature measurements to the controller, the controller being configured to control the deposition of an amount of radiation absorbent material in response to temperature variation of the surface portion.

5. Apparatus according to claim 1, wherein the radiation absorbent material is carbon black.

6. Apparatus for sintering particulate material, the apparatus comprising a printing head comprising radiation absorbent material, and a controller for enabling the exposure of a surface portion of a layer of particulate material to radiation, wherein the controller is arranged to control the variation of radiation absorption across said surface portion by controlling the printing head to deposit an amount of radiation absorbent material to a subset of the layer of particulate material to increase the radiation absorbed by the subset of the layer of particulate material, and the apparatus further comprising a temperature measuring device for measuring the temperature of the surface portion of the layer of particulate material and for providing the surface temperature measurements to the controller, the controller being configured to control the deposition of an amount of radiation absorbent material in response to temperature variation of the surface portion.

\* \* \* \* \*